US006894592B2

(12) United States Patent
Shen et al.

(10) Patent No.: US 6,894,592 B2
(45) Date of Patent: May 17, 2005

(54) MICROMAGNETIC LATCHING SWITCH PACKAGING

(75) Inventors: Jun Shen, Phoenix, AZ (US); Prasad S. Godavarti, Gilbert, AZ (US); John Stafford, Phoenix, AZ (US); Gordon Tam, Gilbert, AZ (US)

(73) Assignee: Magfusion, Inc., Chandler, AZ (US)

( * ) Notice: Subject to any disclaimer, the term of this patent is extended or adjusted under 35 U.S.C. 154(b) by 52 days.

(21) Appl. No.: 10/147,915

(22) Filed: May 20, 2002

(65) Prior Publication Data

US 2003/0011450 A1 Jan. 16, 2003

Related U.S. Application Data

(60) Provisional application No. 60/291,651, filed on May 18, 2001.

(51) Int. Cl.[7] .................................... H01M 51/22
(52) U.S. Cl. .................................... 335/78; 200/181
(58) Field of Search .................................... 335/78–86, 414, 335/415, 421–4, 532; 200/181

(56) References Cited

U.S. PATENT DOCUMENTS

| | | | |
|---|---|---|---|
| 4,065,677 | A | 12/1977 | Micheron et al. |
| 4,461,968 | A | 7/1984 | Kolm et al. |
| 4,496,211 | A | 1/1985 | Daniel |
| 4,570,139 | A | 2/1986 | Kroll |
| 5,016,978 | A | 5/1991 | Fargette et al. |
| 5,048,912 | A | 9/1991 | Kunikane et al. |
| 5,398,011 | A | 3/1995 | Kimura et al. |

(Continued)

FOREIGN PATENT DOCUMENTS

| | | |
|---|---|---|
| DE | 19820821 C1 | 12/1999 |
| DE | 10031569 A1 | 2/2001 |
| EP | 0452012 A2 | 10/1991 |
| EP | 0685864 A1 | 12/1995 |
| EP | 0709911 A2 | 5/1996 |
| EP | 0780858 A1 | 6/1997 |
| EP | 0887879 A1 | 6/1998 |
| EP | 0869519 A1 | 10/1998 |
| FR | 2572546 A1 | 5/1986 |
| JP | 54-161952 | 12/1979 |
| JP | 4-275519 | 10/1992 |
| JP | 6-251684 | 9/1994 |
| WO | WO 97/39468 | 10/1997 |
| WO | WO 98/34269 | 8/1998 |
| WO | WO 9927548 | 6/1999 |

OTHER PUBLICATIONS

International Search Report for International Application No. PCT/US02//15832, mailed on Sep. 6, 2002, six pages.
U.S. Appl. No. 10/126,291, filed Apr. 2002, Stafford et al.

(Continued)

*Primary Examiner*—Lincoln Donovan
(74) *Attorney, Agent, or Firm*—Sterne, Kessler, Goldstein & Fox, PLLC

(57) ABSTRACT

Packages for a micromachined magnetic latching switch, and methods for assembling the packages are described. In one aspect, a substrate is defined by opposing first and second surfaces. A micromagnetic switch integrated circuit (IC) chip is mounted to the first surface. A contact pad on the chip is coupled to a trace on the first surface. A permanent magnet is positioned closely adjacent to the chip. A cap is attached to the first surface. An inner surface of the cap forms an enclosure to enclose the chip on the first surface. The chip can be alternatively mounted to the inner surface of the cap. The chip can be oriented in a standard or flip-chip fashion. In another aspect, a moveable micro-machined cantilever is supported by a surface of a substrate. A cap is attached to the surface. An inner surface of the cap forms an enclosure that encloses the cantilever on the surface of the substrate. A permanent magnet is positioned closely adjacent to the cantilever. An electromagnet is attached to the inner surface or an outer surface of the cap.

19 Claims, 10 Drawing Sheets

U.S. PATENT DOCUMENTS

| | | | | |
|---|---|---|---|---|
| 5,472,539 | A | | 12/1995 | Saia et al. |
| 5,475,353 | A | * | 12/1995 | Roshen et al. ................ 335/78 |
| 5,557,132 | A | | 9/1996 | Takahashi |
| 5,629,918 | A | | 5/1997 | Ho et al. |
| 5,696,619 | A | | 12/1997 | Knipe et al. |
| 5,784,190 | A | | 7/1998 | Worley |
| 5,818,316 | A | | 10/1998 | Shen et al. |
| 5,838,847 | A | | 11/1998 | Pan et al. |
| 5,847,631 | A | | 12/1998 | Taylor et al. |
| 5,898,515 | A | | 4/1999 | Furlani et al. |
| 5,945,898 | A | | 8/1999 | Judy et al. |
| 5,982,554 | A | | 11/1999 | Goldstein et al. |
| 6,016,092 | A | | 1/2000 | Qiu et al. |
| 6,016,095 | A | | 1/2000 | Herbert |
| 6,025,767 | A | * | 2/2000 | Kellam et al. .............. 335/128 |
| 6,028,689 | A | | 2/2000 | Michalicek et al. |
| 6,046,659 | A | | 4/2000 | Loo et al. |
| 6,078,016 | A | | 6/2000 | Yoshikawa et al. |
| 6,084,281 | A | | 7/2000 | Fullin et al. |
| 6,094,116 | A | | 7/2000 | Tai et al. |
| 6,094,293 | A | | 7/2000 | Yokoyama et al. |
| 6,100,477 | A | | 8/2000 | Randall et al. |
| 6,115,231 | A | | 9/2000 | Shirakawa |
| 6,124,650 | A | * | 9/2000 | Bishop et al. ................ 335/78 |
| 6,127,908 | A | | 10/2000 | Bozler et al. |
| 6,133,807 | A | | 10/2000 | Akiyama et al. |
| 6,143,997 | A | | 11/2000 | Feng et al. |
| 6,153,839 | A | | 11/2000 | Zavracky et al. |
| 6,160,230 | A | | 12/2000 | McMillen et al. |
| 6,252,229 | B1 | | 6/2001 | Hays et al. |
| 6,384,353 | B1 | | 5/2002 | Huang et al. |
| 6,410,360 | B1 | | 6/2002 | Steenberge |
| 6,528,869 | B1 | * | 3/2003 | Glenn et al. ................ 257/678 |

OTHER PUBLICATIONS

Richard P. Feymann, "There's Plenty of Room at the Bottom", Dec. 29, 1959, pp. 1–12, Internet Source: http://222.zyvex.com/nanotech/feynman.html.

E. Fullin, J. Gobet, H.A.C. Tilmans, and J. Bergvist, "A New Basic Technology for Magnetic Micro–Actuators", pp. 143–147.

Jack W. Judy and Richard S. Muller "Magnetically Actuated, Addressable Microstructures", Sep. 1997, Journal of Microelectromechanical Systems, vol.6, No. 3, pp. 249–255.

Ezekiel JJ Kruglick and Kristofer SJ Pister, "Project Overview: Micro–Relays", Tech. Digital Solid–State Sensor and Actuator Workshop, 1998, Hilton Head 98 and 19$^{th}$ International Conference on Electric Contact Phenomena, Nuremburg, Germany, Sept. 1998 (Downloaded from Internet Source: http://www–bsac.eecs.berkeley.edu/Kruglick/relays/relays.html, on Jul. 12, 1999) 2 pgs.

Ezekiel J.J. Kruglick and Kristofer S.J. Pister, "Bistable MEMS Relays and Contact Characterization", Tech. Digital Solid–State Sensor and Actuator Workshop, Hilton Head, 1988 and 19$^{th}$ International Conference on Electric Contact Phenomena, Nuremburg. Germany, Sept. 1998, 5 pgs.

Laure K. Lagorce and Oliver Brand, "Magnetic Microactuators Based on Polymer Magnets", Mar. 1999, IEEE Journal of Microelectromechanical Systems, IEEE, vol. 8., No. 1., 8 pages.

"P10D Electricity and Magnetism Lecture 14", Internet Source: http://scitec.uwhichill.edu.bb/cmp/online/P10D/Lecture14/lect14.htn, Jan. 3, 2000, pp. 1–5.

"Ultraminiature Magnetic Latching to 5–relays SPDT DC TO C Band", Series RF 341, product information from Teledyne Relays, 1998.

M. Ruan et al., "Latching Microelectromagnetic Relays", Sensors and Actuators A 91 (Jul. 15, 2001), Copyright 2001 Elsevier Science B.V., pp. 346–350.

Xi–Qing Sun, K.R. Farmer, W.N. Carr, "A Bistable Microrelay Based on Two–Segment Multimorph Cantilever Actuators", 11$^{th}$ Annual Workshop on Micro Electrical Mechanical Systems, Heidelberg, Germany, IEEE, Jan. 25–29, 1998, pp. 154–159.

William P. Taylor and Mark G. Allen, "Integrated Magnetic Microrelays: Normally Open, Normally Closed, and Multi–Pole Devices", 1997 International Conference on Solid–State Sensors and Actuators, IEEE, Jun. 16–19, 1997, pp. 1149–1152.

William P. Taylor, Oliver Brand, and Mark G. Allen. "Fully Intergrated Magnetically Actuated Micromachined Relays", Journal of Microelectromechanical Systems, IEEE, vol. 7, No. 2, Jun. 1998, pp. 181–191.

Tilmans, et al., "A Fully–Packaged Electromagnetic Microrelay", Proc. MEMS '99, Orlando, FL, Jan. 17–21, 1999, copyright IEEE 1999, pp. 25–30..

William Trimmer, "The Scaling of Micromechanical Devices", Internet Source: http://home.earthlink.net/–trimmerw/mems/scale.html on Jan. 3, 2000 (adapted from article Microrobots and Michromechanical Systems by W.S.N. Trimmer, Sensors and Actuators, vol. 19, No. 3, Sep. 1989, pp. 267–287, and other sources).

John A. Wright and Yu–Chong Tai, "Micro–Miniature Electctromagnetic Switches Fabricated Using MEMS Technology", Proceedings 46$^{th}$ Annual International Relay Conference: NARM '98, Apr. 1998, pp. 13–1 to 13–4.

John A. Wright Yu–Chong Tai and Gerald Lilienthal, "A Magnetostatic MEMS Switch for DC Brushless Motor Commutation", Proceedings Solid State Sensor and Actuator Workshop, Hilton Head, Jun. 1998, pp. 304–307.

John A. Wright, Yu–Chong Tai, and Shih–Chia Chang, "A Large–Force, Fully–Integrated MEMS Magnetic Actuator", Transducers '97, 1997 International Conference on Solid State Sensors and Actuators, Chicago, Jun. 16–19, 1997.

Ann, Chong H. & Allen, Mark G., A Fully Integrated Micromagnetic Actuator With a Multilevel Meander Magnetic Core, 1992 IEEE, Solid–State Sensor and Actuator Workshop, Technical Digest, Hilton Head Island, South Carolina, Jun. 22–25, 1992, Technical Digest, pp. 14–17.

English–Language Abstract of DE 10031569, published Feb. 1, 2001, 1 page.

English–Language Abstract of DE 19820821, published Dec. 6, 1999, 1 page.

English–Language Abstract of EP 0780858, published Jun. 25, 1997, 1 page.

English–Language Abstract of EP 0869519, published Oct. 7, 1998, 1 page.

English–Language Abstract of FR 2572546, published May 2, 1986, 1 page.

English–Language Abstract of JP 4275519, published Oct. 1, 1992, 1 page.

English–Language Abstract of JP 6251684, published Sep. 9, 1994, 1 page.

English–Language Abstract of JP 54161952, published Dec. 22, 1979, 1 page.

English–Language Abstract of WO 9927548, published Jun. 3, 1999, 1 page.

Copy of Written Opinion recieved in International Application No. PCT/US02/15832, mailed Apr. 11, 2003, 4 pages.

* cited by examiner

MICROMAGNETIC LATCHING SWITCH PACKAGING

CROSS-REFERENCE TO RELATED APPLICATIONS

This application claims the benefit of U.S. Provisional Application No. 60/291,651, filed May 18, 2001, which is herein incorporated by reference in its entirety.

U.S. Non-provisional Application No. 10/126,291, titled "Latching Micro Magnetic Relay Packages and Methods of Packaging," filed on Apr. 18, 2002, which claims the benefit of U.S. Provisional Application No. 60/322,841, filed Sep. 17, 2001, is herein incorporated by reference in its entirety.

U.S. Non-provisional Application No. 10/147,918, titled "Apparatus Utilizing Latching Micromagnetic Switches," filed on May 20, 2002, which claims the benefit of U.S. Provisional Application No. 60/291,651, filed May 18, 2001, is herein incorporated by reference in its entirety.

BACKGROUND OF THE INVENTION

1. Field of the Invention

The present invention relates to electronic and optical switches. More specifically, the present invention relates to packaging of micromagnetic latching switches.

2. Background Art

Switches are typically electrically controlled two-state devices that open and close contacts to effect operation of devices in an electrical or optical circuit. Relays, for example, typically function as switches that activate or de-activate portions of electrical, optical or other devices. Relays are commonly used in many applications including telecommunications, radio frequency (RF) communications, portable electronics, consumer and industrial electronics, aerospace, and other systems. More recently, optical switches (also referred to as "optical relays" or simply "relays" herein) have been used to switch optical signals (such as those in optical communication systems) from one path to another.

Although the earliest relays were mechanical or solid-state devices, recent developments in micro-electro-mechanical systems (MEMS) technologies and microelectronics manufacturing have made micro-electrostatic and micromagnetic relays possible. Such micromagnetic relays typically include an electromagnet that energizes an armature to make or break an electrical contact. When the magnet is de-energized, a spring or other mechanical force typically restores the armature to a quiescent position. Such relays typically exhibit a number of marked disadvantages, however, in that they generally exhibit only a single stable output (i.e., the quiescent state) and they are not latching (i.e., they do not retain a constant output as power is removed from the relay). Moreover, the spring required by conventional micromagnetic relays may degrade or break over time.

Non-latching micromagnetic relays are known. The relay includes a permanent magnet and an electromagnet for generating a magnetic field that intermittently opposes the field generated by the permanent magnet. The relay must consume power in the electromagnet to maintain at least one of the output states. Moreover, the power required to generate the opposing field would be significant, thus making the relay less desirable for use in space, portable electronics, and other applications that demand low power consumption.

The basic elements of a latching micromagnetic switch include a permanent magnet, a substrate, a coil, and a cantilever at least partially made of soft magnetic materials. In its optimal configuration, the permanent magnet produces a static magnetic field that is relatively perpendicular to the horizontal plane of the cantilever. However, the magnetic field lines produced by a permanent magnet with a typical regular shape (disk, square, etc.) are not necessarily perpendicular to a plane, especially at the edge of the magnet. Then, any horizontal component of the magnetic field due to the permanent magnet can either eliminate one of the bistable states, or greatly increase the current that is needed to switch the cantilever from one state to the other. Careful alignment of the permanent magnet relative to the cantilever so as to locate the cantilever in the right spot of the permanent magnet field (usually near the center) will permit bi-stability and minimize switching current. Nevertheless, high-volume production of the switch can become difficult and costly if the alignment error tolerance is small.

What is desired is a bi-stable, latching switch with relaxed permanent magnet alignment requirements and reduced power requirements. Such a switch should also be reliable, simple in design, low-cost and easy to manufacture, and should be useful in optical and/or electrical environments. Furthermore, the switch should be configured to tolerate environmental conditions such as humidity, dust and other contaminants, and electrical and magnetic interferences.

BRIEF SUMMARY OF THE INVENTION

The micromagnetic latching switches of the present invention can be used in a plethora of products including household and industrial appliances, consumer electronics, military hardware, medical devices and vehicles of all types, just to name a few broad categories of goods. The micromagnetic latching switches of the present invention have the advantages of compactness, simplicity of fabrication, and have good performance at high frequencies, which lends them to many novel applications in many RF applications.

The present invention is directed to a micro magnetic latching device. The device, or switch, comprises a substrate having a moveable element supported thereon. The moveable element, or cantilever, has a long axis and a magnetic material. The device also has first and second magnets that produce a first magnetic field, which induces a magnetization in the magnetic material. The magnetization is characterized by a magnetization vector pointing in a direction along the long axis of the moveable element, wherein the first magnetic field is approximately perpendicular to a major central portion of the long axis. The device also has a coil that produces a second magnetic field to switch the movable element between two stable states, wherein only temporary application of the second magnetic field is required to change direction of the magnetization vector thereby causing the movable element to switch between the two stable states.

Packages for a micromachined magnetic latching switches are described. The packages are used to protect and encapsulate the micromagnetic latching switch of the present invention. The packages also allow for coupling of power, ground, and other electrical signals between the micromagnetic latching switch and a printed circuit board (PCB). The packages also provide for thermal management of the micromagnetic latching switch.

In one aspect, packages for micromagnetic latching switches are disclosed. A substrate is defined by opposing first and second surfaces. The substrate includes a conductively filled via. The via couples a trace on the first surface of the substrate to a solder ball pad on the second surface of the substrate. A micromagnetic switch integrated circuit (IC) chip is mounted to the first surface. A contact pad on the chip is coupled to the trace. A permanent magnet is positioned closely adjacent to the chip. A cap is attached to the first surface. An inner surface of the cap forms an enclosure to enclose the chip on the first surface.

In a further aspect, the permanent magnet is attached to the inner surface of the cap. In another aspect, the permanent magnet is attached to the chip.

In a further aspect, a bond wire couples the contact pad on the chip to the trace.

In a further aspect, the chip is mounted to the first surface in a standard fashion. In another aspect, the chip is flip chip mounted to the first surface.

In a still further aspect, the package further includes a solder ball attached to the solder ball pad.

In another aspect, further packages for a micromagnetic latching switch of the present invention are disclosed. A substrate is defined by opposing first and second surfaces. The substrate includes a conductively filled via. The via couples a trace on the first surface of the substrate to a solder ball pad on the second surface of the substrate. A cap is attached to the first surface. An inner surface of the cap forms an enclosure that encloses a portion of the first surface. A micromagnetic switch integrated circuit (IC) chip is mounted to the inner surface. A wire bond couples a contact pad on the chip to the trace.

In a further aspect, the package includes a permanent magnet positioned closely adjacent to the chip. In a still further aspect, the permanent magnet is mounted on the first surface of the substrate.

In another aspect, further packages for a micromagnetic latching switch of the present invention are disclosed. A substrate has a surface. A moveable micro-machined cantilever is supported by the surface of the substrate. A cap is attached to the surface of the substrate. An inner surface of the cap forms an enclosure that encloses the cantilever on the surface of the substrate. A permanent magnet is positioned closely adjacent to the cantilever. An electromagnet is attached to the cap.

In a further aspect, the electromagnet includes a conductor, and an insulator layer that insulates the conductor.

In a further aspect, the permanent magnet is attached to a second surface of the substrate.

In a further aspect, the electromagnet is coupled to the inner surface of the cap. A magnetic layer can be formed between the inner surface and the electromagnet.

In a still further aspect, the electromagnet is attached to an outer surface of the cap. A magnetic layer can be formed on the electromagnet.

These and other objects, advantages and features will become readily apparent in view of the following detailed description of the invention.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 4A:
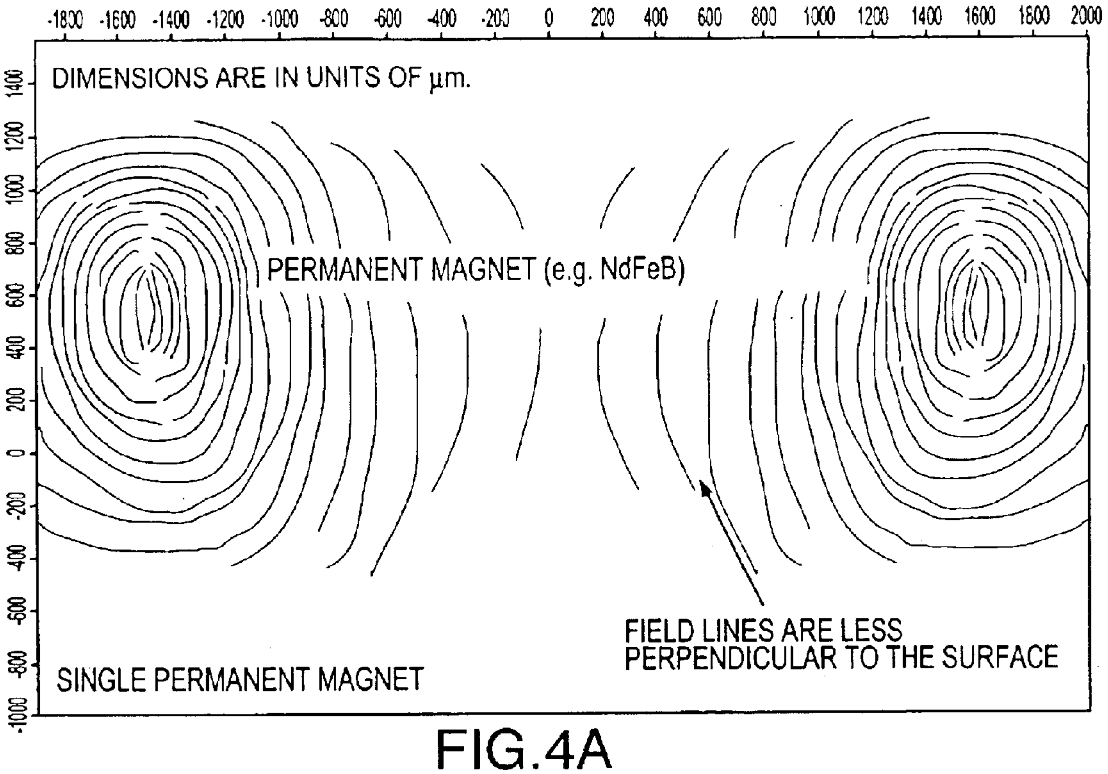
FIGS. 4A and 4B show computer simulations of magnetic flux distributions, according to the present invention.
Figure 4B:
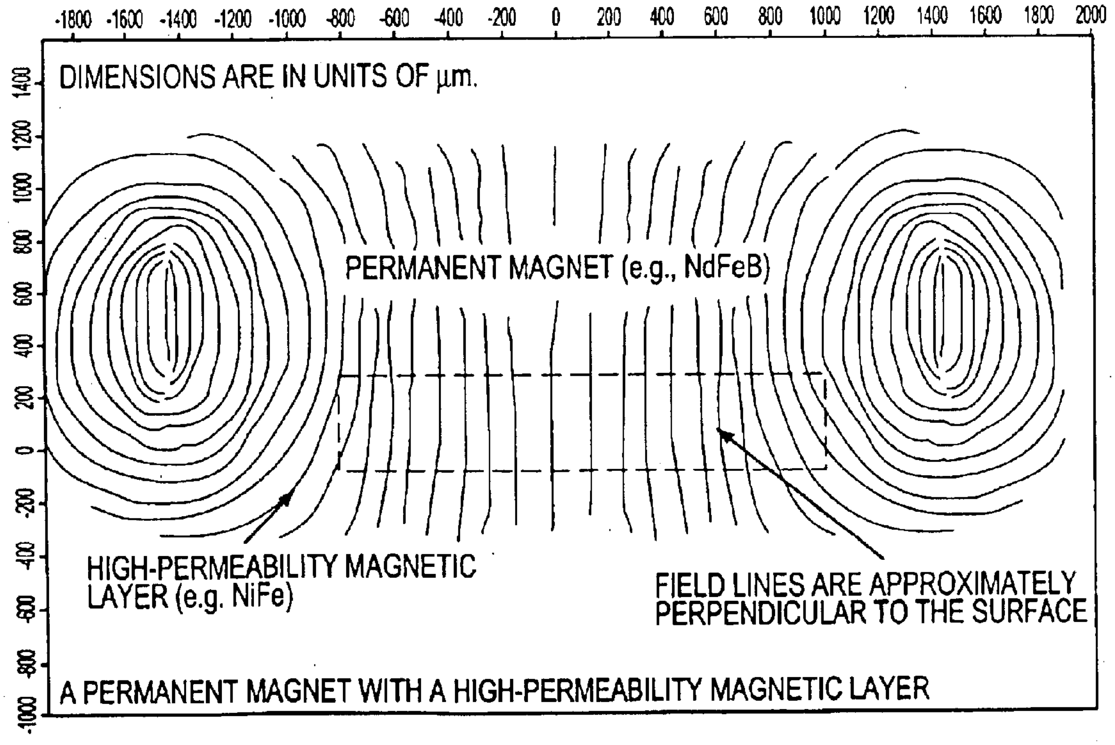
Figure 5A:
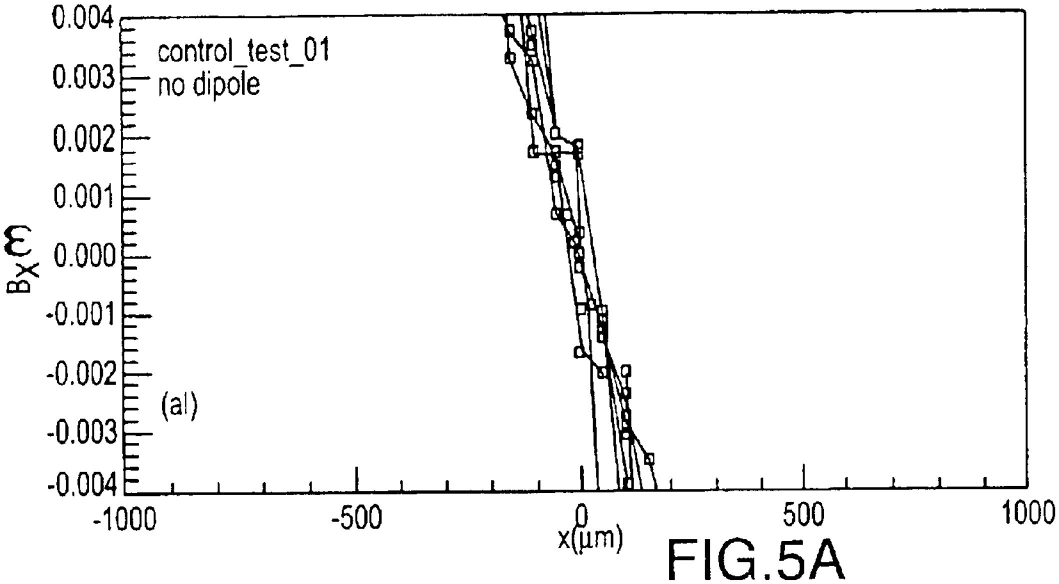
Figure 5B:
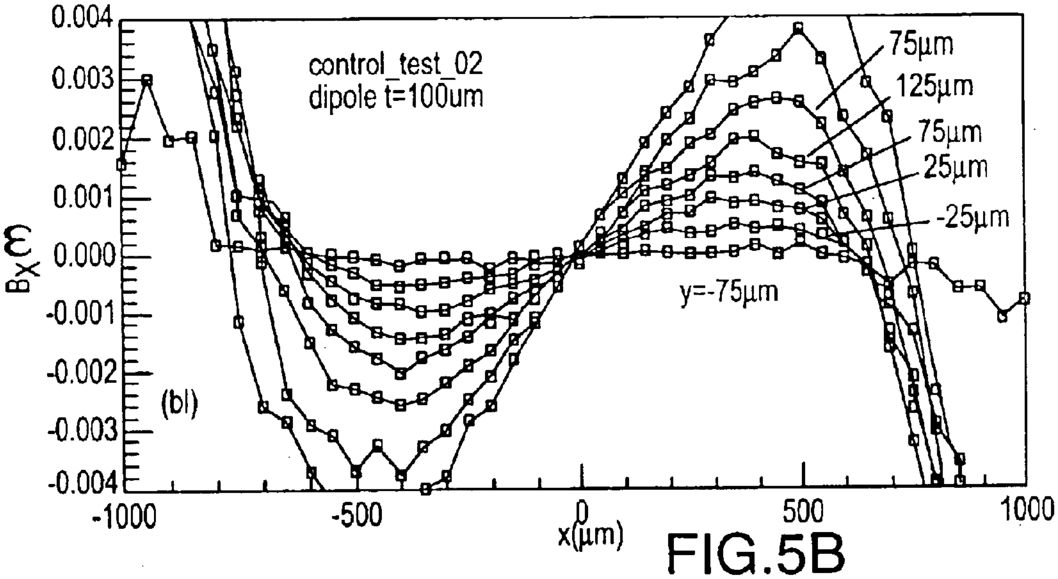
Figure 5C:
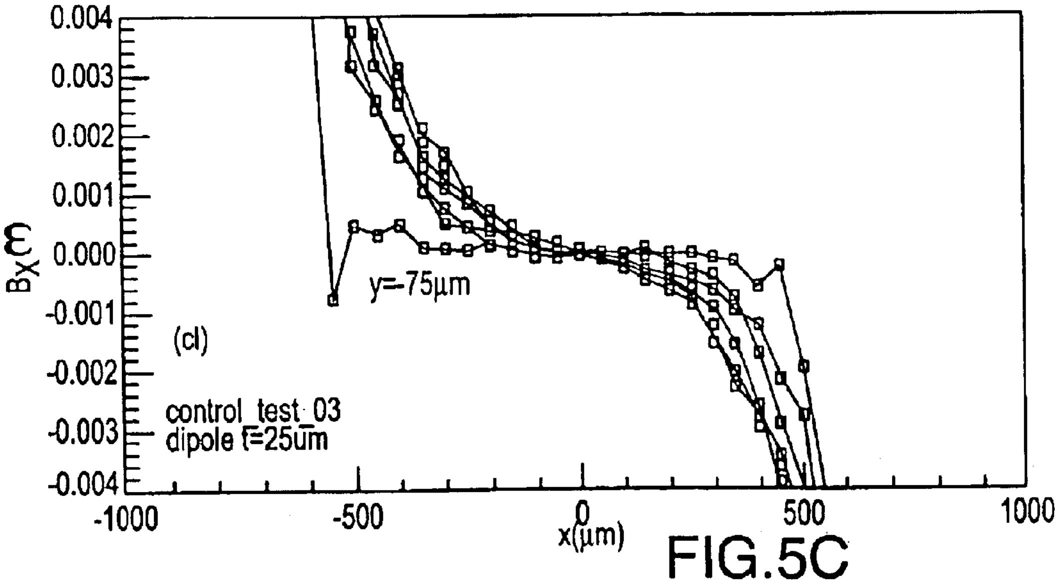

FIGS. 5A–C show extracted horizontal components (Bx) of the magnetic flux in FIG. 4.

Figure 6A:
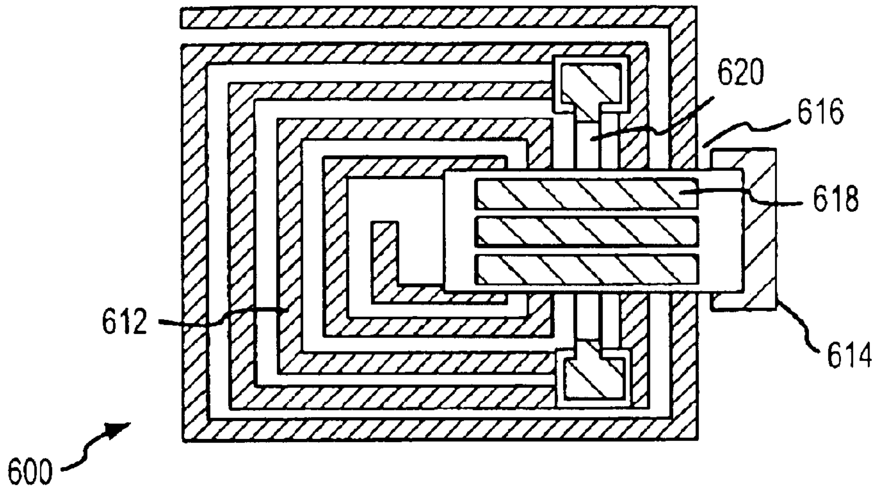
Figure 6B:
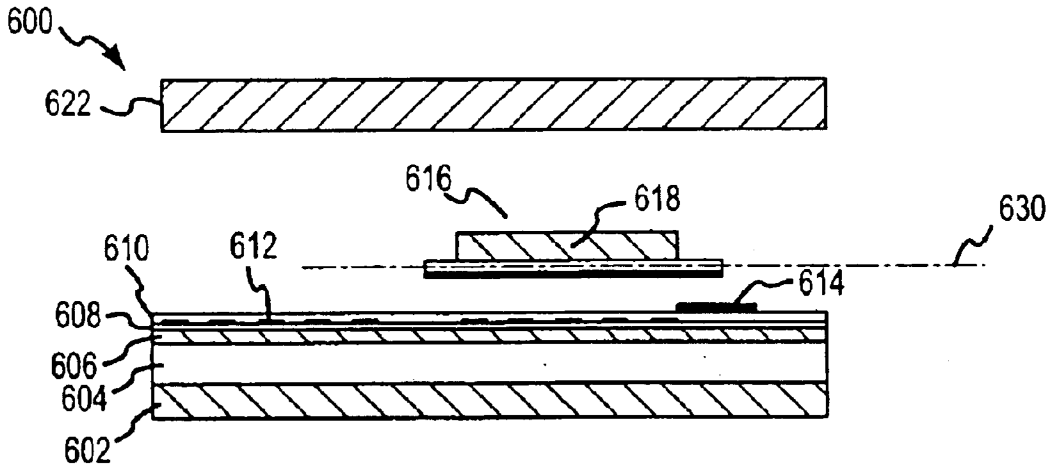

FIGS. 6A and 6B show a top view and a side view, respectively, of a micromagnetic latching switch 600 with relaxed permanent magnet alignment according to an aspect of the present invention.

Figure 7:
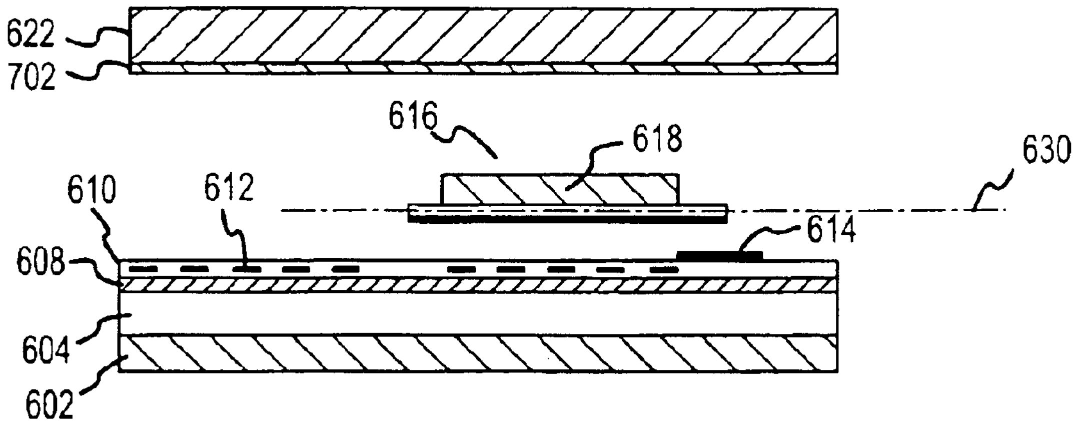
Figure 8:
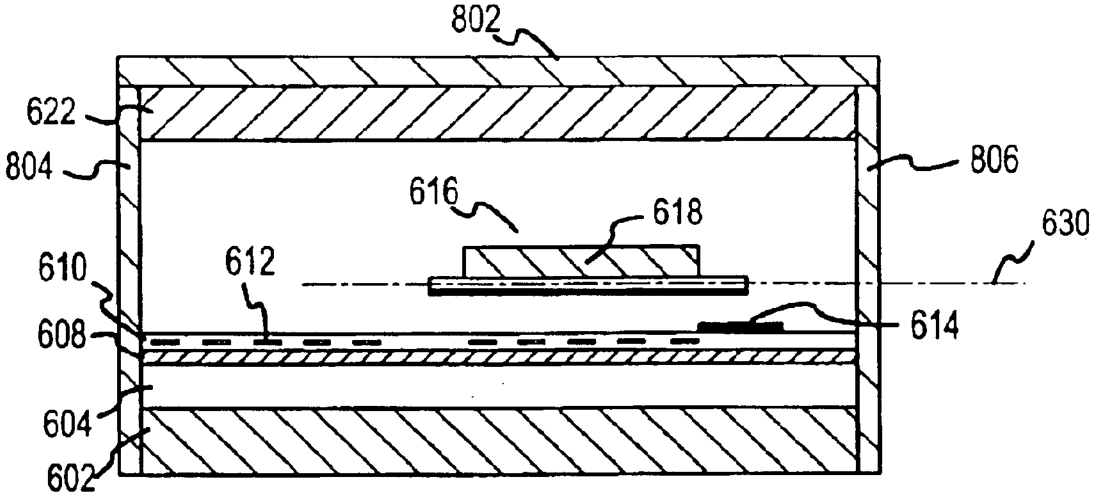

FIGS. 7 and 8 show further embodiments of the micromagnetic latching switch according to the present invention.

Figure 9A:
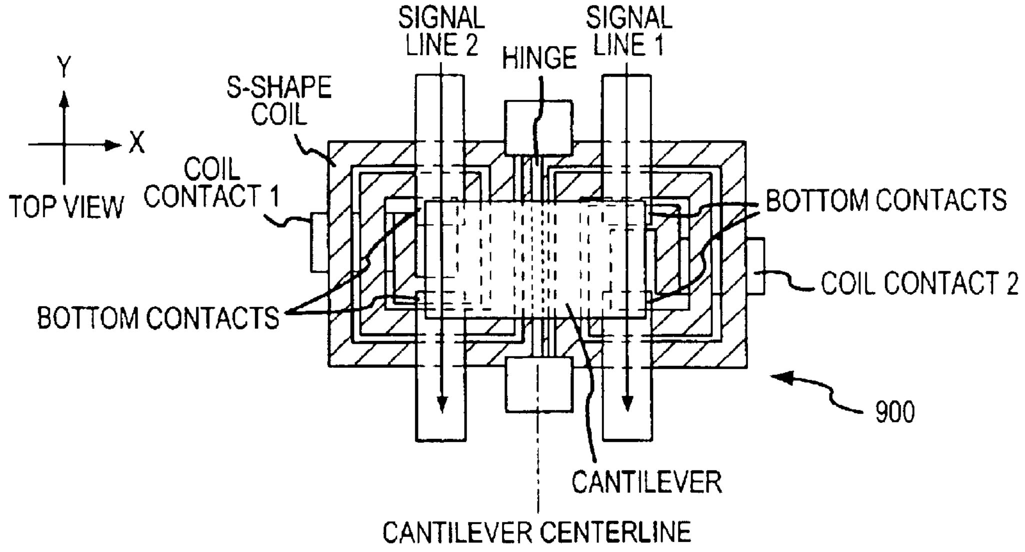
Figure 9B:
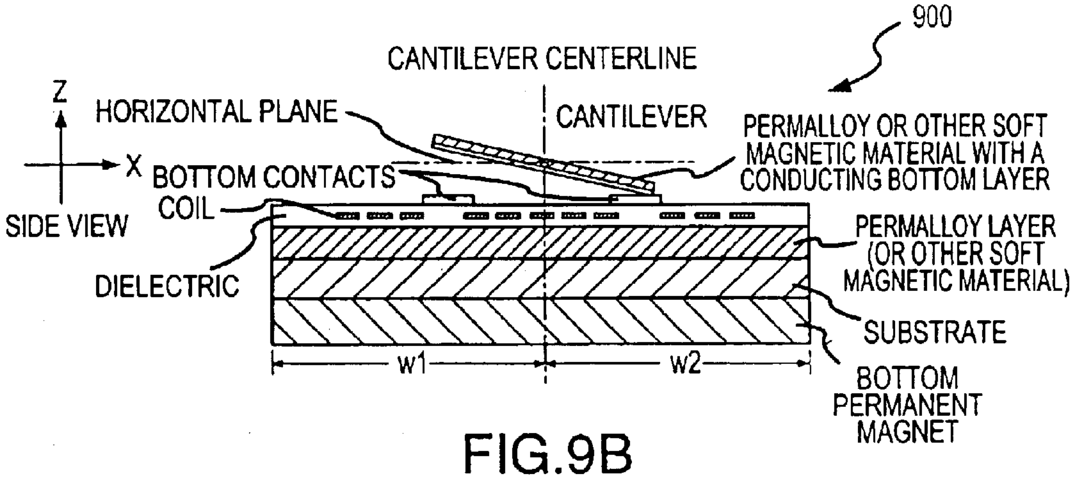

FIGS. 9A and 9B show a top view and a side view, respectively, of a micromagnetic latching switch with additional features of the present invention.

Figure 10:
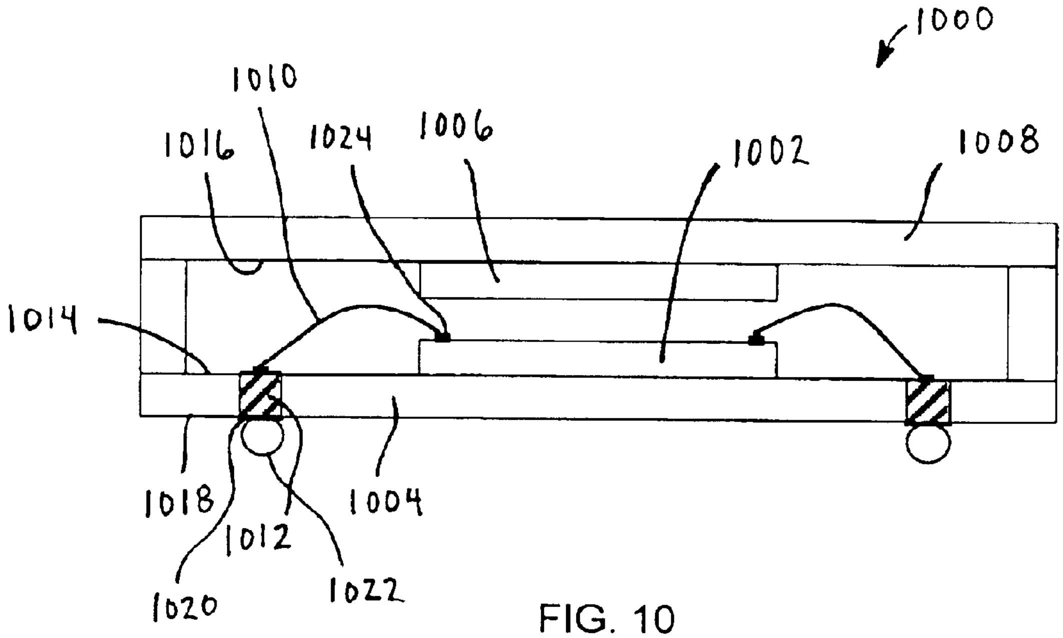
Figure 11:
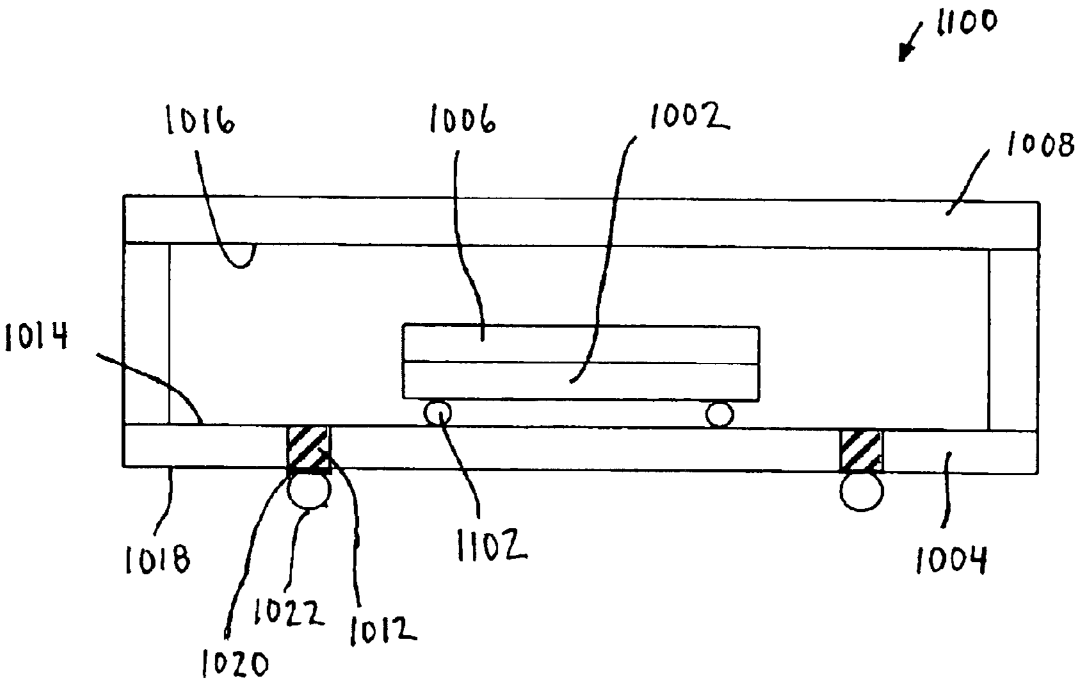
Figure 12:
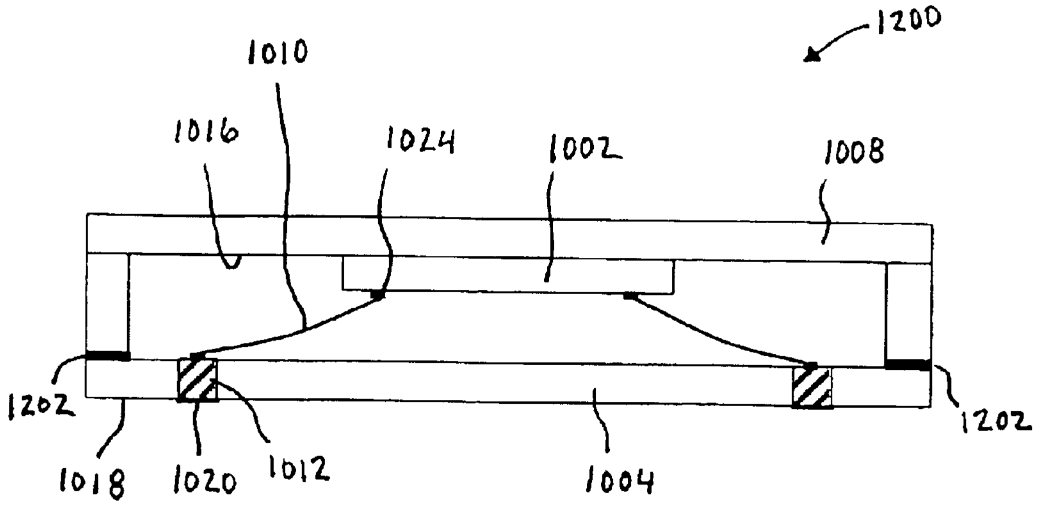

FIGS. 10–12 illustrate example embodiments for packaging a latching micromagnetic switch, according to the present invention.

Figure 13:
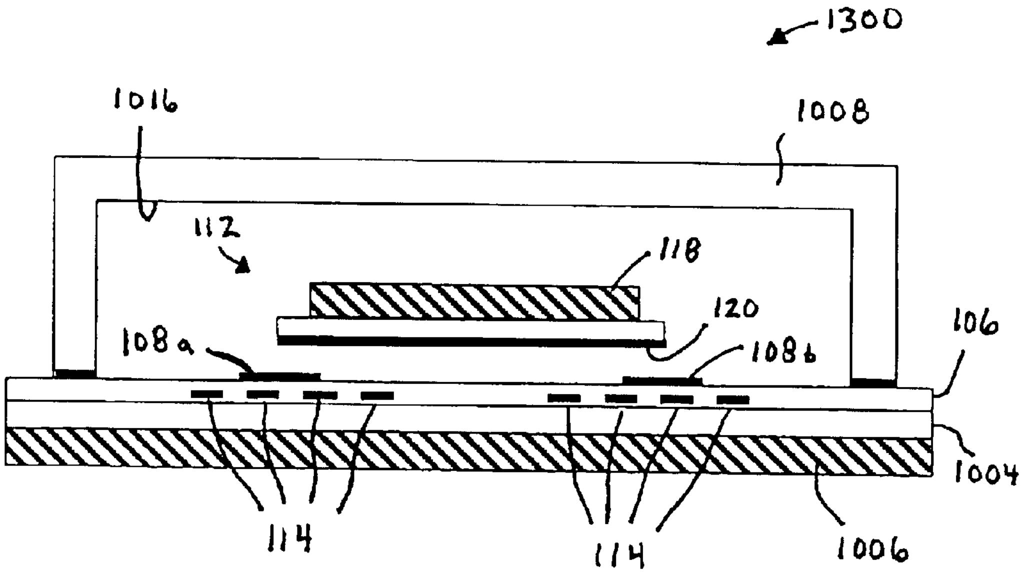
Figure 14:
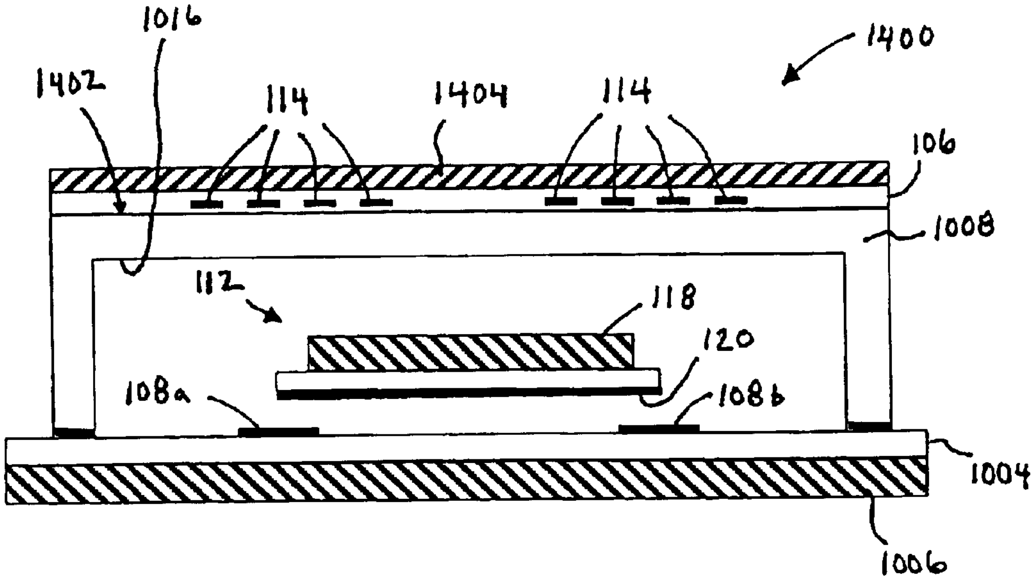
Figure 15:
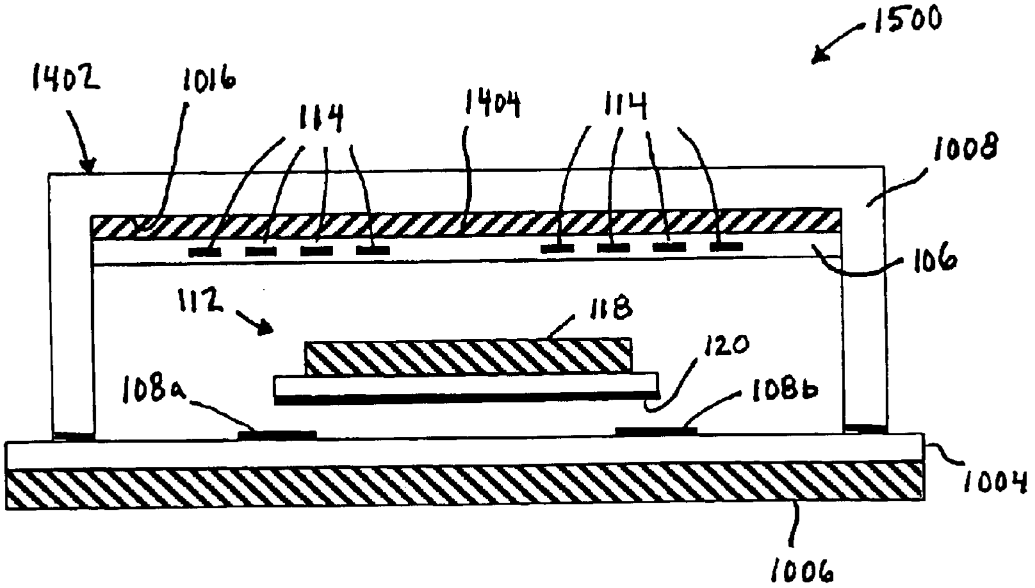

FIGS. 13–15 illustrate example packaging embodiments for a latching micromagnetic switch, with various coil arrangements, according the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

It should be appreciated that the particular implementations shown and described herein are examples of the invention and are not intended to otherwise limit the scope of the present invention in any way. Indeed, for the sake of brevity, conventional electronics, manufacturing, MEMS technologies and other functional aspects of the systems (and components of the individual operating components of the systems) may not be described in detail herein. Furthermore, for purposes of brevity, the invention is frequently described herein as pertaining to a micro-electronically-machined relay for use in electrical or electronic systems. It should be appreciated that many other manufacturing techniques could be used to create the relays described herein, and that the techniques described herein could be used in mechanical relays, optical relays or any other switching device. Further, the techniques would be suitable for application in electrical systems, optical systems, consumer electronics, industrial electronics, wireless systems, space applications, or any other application.

The terms, chip, integrated circuit, monolithic device, semiconductor device, and microelectronic device, are often used interchangeably in this field. The present invention is applicable to all the above as they are generally understood in the field.

The terms metal line, transmission line, interconnect line, trace, wire, conductor, signal path and signaling medium are all related. The related terms listed above, are generally interchangeable, and appear in order from specific to general. In this field, metal lines are sometimes referred to as traces, wires, lines, interconnect or simply metal. Metal lines, generally aluminum (Al), copper (Cu) or an alloy of Al and Cu, are conductors that provide signal paths for coupling or interconnecting, electrical circuitry. Conductors other than metal are available in microelectronic devices. Materials such as doped polysilicon, doped single-crystal silicon (often referred to simply as diffusion, regardless of whether such doping is achieved by thermal diffusion or ion implantation), titanium (Ti), molybdenum (Mo), and refractory metal suicides are examples of other conductors.

The terms contact and via, both refer to structures for electrical connection of conductors from different interconnect levels. These terms are sometimes used in the art to describe both an opening in an insulator in which the structure will be completed, and the completed structure itself. For purposes of this disclosure contact and via refer to the completed structure.

The term vertical, as used herein, means substantially orthogonal to the surface of a substrate. Moreover, it should be understood that the spatial descriptions (e.g., "above", "below", "up", "down", "top", "bottom", etc.) made herein are for purposes of illustration only, and that practical latching relays can be spatially arranged in any orientation or manner.

The above-described micromagnetic latching switch is further described in international patent publications WO0157899 (titled Electronically Switching Latching Micro-magnetic Relay And Method of Operating Same), and WO0184211 (titled Electronically Micro-magnetic latching switches and Method of Operating Same), to Shen et al. These patent publications provide a thorough background on micromagnetic latching switches and are incorporated herein by reference in their entirety. Moreover, the details of the switches disclosed in WO0157899 and WO0184211 are applicable to implement the switch embodiments of the present invention as described below.

Overview of a Latching Switch

Figure 1A:
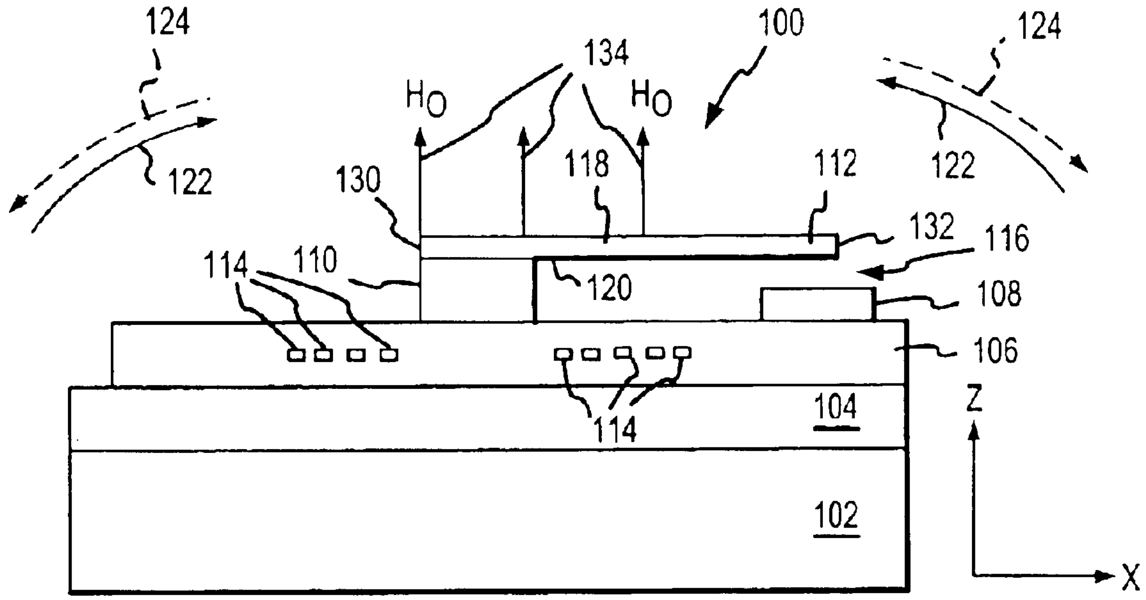
FIGS. 1A and 1B are side and top views, respectively, of an exemplary embodiment of a switch.
Figure 1B:
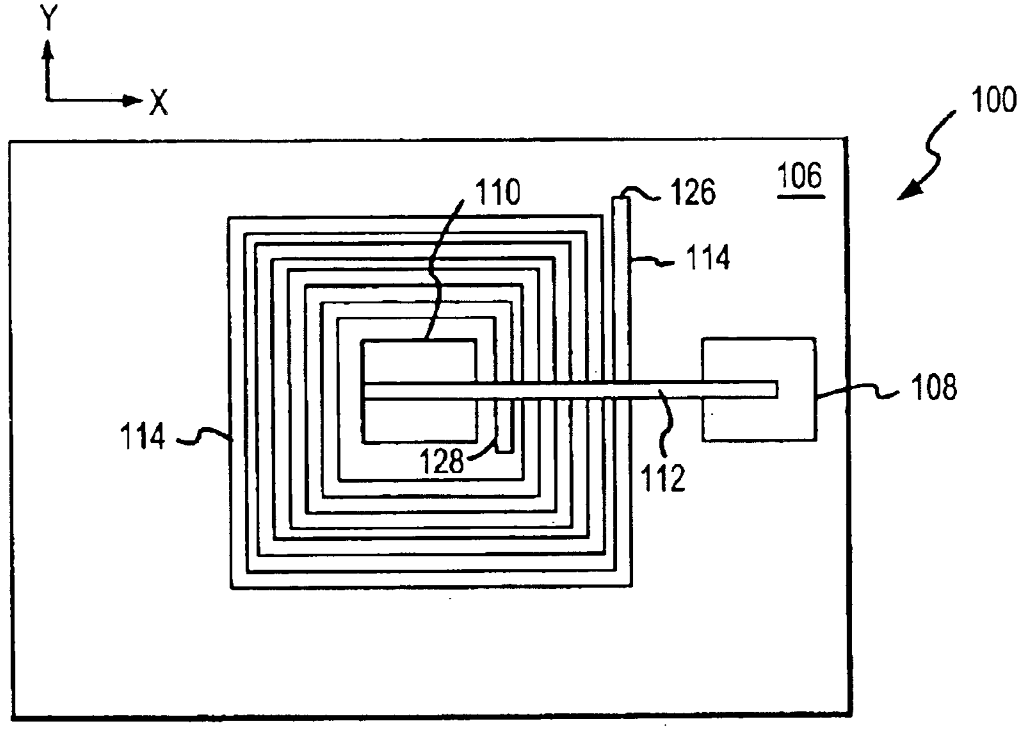

FIGS. 1A and 1B show side and top views, respectively, of a latching switch. The terms switch and device are used herein interchangeably to described the structure of the present invention. With reference to FIGS. 1A and 1B, an exemplary latching relay 100 suitably includes a magnet 102, a substrate 104, an insulating layer 106 housing a conductor 114, a contact 108 and a cantilever (moveable element) 112 positioned or supported above substrate by a staging layer 110.

Magnet 102 is any type of magnet such as a permanent magnet, an electromagnet, or any other type of magnet capable of generating a magnetic field $H_0$ 134, as described more fully below. By way of example and not limitation, the magnet 102 can be a model 59-P09213T001 magnet available from the Dexter Magnetic Technologies corporation of Fremont, Calif., although of course other types of magnets could be used. Magnetic field 134 can be generated in any manner and with any magnitude, such as from about 1 Oersted to $10^4$ Oersted or more. The strength of the field depends on the force required to hold the cantilever in a given state, and thus is implementation dependent. In the exemplary embodiment shown in FIG. 1A, magnetic field $H_0$ 134 can be generated approximately parallel to the Z axis and with a magnitude on the order of about 370 Oersted, although other embodiments will use varying orientations and magnitudes for magnetic field 134. In various embodiments, a single magnet 102 can be used in conjunction with a number of relays 100 sharing a common substrate 104.

Substrate 104 is formed of any type of substrate material such as silicon, gallium arsenide, glass, plastic, metal or any other substrate material. In various embodiments, substrate 104 can be coated with an insulating material (such as an oxide) and planarized or otherwise made flat. In various embodiments, a number of latching relays 100 can share a single substrate 104. Alternatively, other devices (such as transistors, diodes, or other electronic devices) could be formed upon substrate 104 along with one or more relays 100 using, for example, conventional integrated circuit manufacturing techniques. Alternatively, magnet 102 could be used as a substrate and the additional components discussed below could be formed directly on magnet 102. In such embodiments, a separate substrate 104 may not be required.

Insulating layer 106 is formed of any material such as oxide or another insulator such as a thin-film insulator. In an exemplary embodiment, insulating layer is formed of Probimide 7510 material. Insulating layer 106 suitably houses conductor 114. Conductor 114 is shown in FIGS. 1A and 1B to be a single conductor having two ends 126 and 128 arranged in a coil pattern. Alternate embodiments of conductor 114 use single or multiple conducting segments arranged in any suitable pattern such as a meander pattern, a serpentine pattern, a random pattern, or any other pattern. Conductor 114 is formed of any material capable of conducting electricity such as gold, silver, copper, aluminum, metal or the like. As conductor 114 conducts electricity, a magnetic field is generated around conductor 114 as discussed more fully below.

Cantilever (moveable element) 112 is any armature, extension, outcropping or member that is capable of being affected by magnetic force. In the embodiment shown in FIG. 1A, cantilever 112 suitably includes a magnetic layer 118 and a conducting layer 120. Magnetic layer 118 can be formulated of permalloy (such as NiFe alloy) or any other magnetically sensitive material. Conducting layer 120 can be formulated of gold, silver, copper, aluminum, metal or any other conducting material. In various embodiments, cantilever 112 exhibits two states corresponding to whether relay 100 is "open" or "closed", as described more fully below. In many embodiments, relay 100 is said to be "closed" when a conducting layer 120, connects staging layer 110 to contact 108. Conversely, the relay may be said to be "open" when cantilever 112 is not in electrical contact with contact 108. Because cantilever 112 can physically move in and out of contact with contact 108, various embodiments of cantilever 112 will be made flexible so that cantilever 112 can bend as appropriate. Flexibility can be created by varying the thickness of the cantilever (or its various component layers), by patterning or otherwise making holes or cuts in the cantilever, or by using increasingly flexible materials.

Alternatively, cantilever 112 can be made into a "hinged" arrangement. Although of course the dimensions of cantilever 112 can vary dramatically from implementation to implementation, an exemplary cantilever 112 suitable for use in a micromagnetic relay 100 can be on the order of 10–1000 microns in length, 1–40 microns in thickness, and 2–600 microns in width. For example, an exemplary cantilever in accordance with the embodiment shown in FIGS. 1A and 1B can have dimensions of about 600 microns×10 microns×50 microns, or 1000 microns×600 microns×25 microns, or any other suitable dimensions.

Contact 108 and staging layer 110 are placed on insulating layer 106, as appropriate. In various embodiments, staging layer 110 supports cantilever 112 above insulating layer 106, creating a gap 116 that can be vacuum or can become filled with air or another gas or liquid such as oil. Although the size of gap 116 varies widely with different implementations, an exemplary gap 116 can be on the order of 1–100 microns, such as about 20 microns, Contact 108 can receive cantilever 112 when relay 100 is in a closed state, as described below. Contact 108 and staging layer 110 can be formed of any conducting material such as gold, gold alloy, silver, copper, aluminum, metal or the like. In various embodiments, contact 108 and staging layer 110 are formed of similar conducting materials, and the relay is considered to be "closed" when cantilever 112 completes a circuit between staging layer 110 and contact 108. In certain embodiments wherein cantilever 112 does not conduct electricity, staging layer 110 can be formulated of non-conducting material such as Probimide material, oxide, or any other material. Additionally, alternate embodiments may not require staging layer 110 if cantilever 112 is otherwise supported above insulating layer 106.

Principle of Operation of a Micromagnetic Latching Switch

When it is in the "down" position, the cantilever makes electrical contact with the bottom conductor, and the switch is "on" (also called the "closed" state). When the contact end is "up", the switch is "off" (also called the "open" state). These two stable states produce the switching function by the moveable cantilever element. The permanent magnet holds the cantilever in either the "up" or the "down" position after switching, making the device a latching relay. A current is passed through the coil (e.g., the coil is energized) only during a brief (temporary) period of time to transition between the two states.

(i) Method to Produce Bi-Stability

Figure 2:
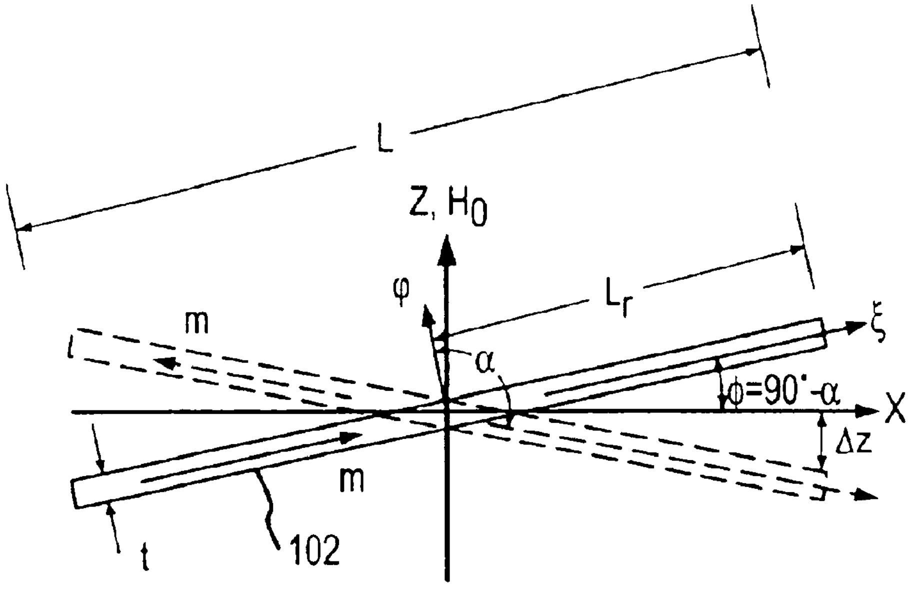
FIG. 2 illustrates the principle by which bi-stability is produced.

The principle by which bi-stability is produced is illustrated with reference to FIG. 2. When the length L of a permalloy cantilever 112 is much larger than its thickness t and width (w, not shown), the direction along its long axis L becomes the preferred direction for magnetization (also called the "easy axis"). When a major central portion of the cantilever is placed in a uniform permanent magnetic field, a torque is exerted on the cantilever. The torque can be either clockwise or counterclockwise, depending on the initial orientation of the cantilever with respect to the magnetic field. When the angle ($\alpha$) between the cantilever axis ($\xi$) and the external field ($H_0$) is smaller than 90°, the torque is counterclockwise; and when $\alpha$ is larger than 90°, the torque is clockwise. The bi-directional torque arises because of the bi-directional magnetization (i.e., a magnetization vector "m" points one direction or the other direction, as shown in FIG. 2) of the cantilever (m points from left to right when $\alpha<90°$, and from right to left when $\alpha>90°$). Due to the torque, the cantilever tends to align with the external magnetic field ($H_0$). However, when a mechanical force (such as the elastic torque of the cantilever, a physical stopper, etc.) preempts to the total realignment with $H_0$, two stable positions ("up" and "down") are available, which forms the basis of latching in the switch.

(ii) Electrical Switching

If the bi-directional magnetization along the easy axis of the cantilever arising from $H_0$ can be momentarily reversed by applying a second magnetic field to overcome the influence of ($H_0$), then it is possible to achieve a switchable latching relay. This scenario is realized by situating a planar coil under or over the cantilever to produce the required temporary switching field. The planar coil geometry was chosen because it is relatively simple to fabricate, though other structures (such as a wrap-around, three dimensional type) are also possible. The magnetic field (Hcoil) lines generated by a short current pulse loop around the coil. It is mainly the $\xi$-component (along the cantilever, see FIG. 2) of this field that is used to reorient the magnetization (magnetization vector "m") in the cantilever. The direction of the coil current determines whether a positive or a negative $\xi$-field component is generated. Plural coils can be used. After switching, the permanent magnetic field holds the cantilever in this state until the next switching event is encountered. Since the $\xi$-component of the coil-generated field (Hcoil-$\xi$) only needs to be momentarily larger than the $\xi$-component [$H_0\xi H_0 \cos(\alpha)=H_0 \sin(\phi)$, $\alpha=90°-\phi$] of the permanent magnetic field and $\phi$ is typically very small (e.g., $\phi\leqq 5°$), switching current and power can be very low, which is an important consideration in micro relay design.

The operation principle can be summarized as follows: A permalloy cantilever in a uniform (in practice, the field can be just approximately uniform) magnetic field can have a clockwise or a counterclockwise torque depending on the angle between its long axis (easy axis, L) and the field. Two bi-stable states are possible when other forces can balance die torque. A coil can generate a momentary magnetic field to switch the orientation of magnetization (vector m) along the cantilever and thus switch the cantilever between the two states.

Relaxed Alignment of Magnets

To address the issue of relaxing the magnet alignment requirement, the inventors have developed a technique to create perpendicular magnetic fields in a relatively large region around the cantilever. The invention is based on the fact that the magnetic field lines in a low permeability media (e.g., air) are basically perpendicular to the surface of a very high permeability material (e.g., materials that are easily magnetized, such as permalloy). When the cantilever is placed in proximity to such a surface and the cantilever's horizontal plane is parallel to the surface of the high permeability material, the above stated objectives can be at least partially achieved. The generic scheme is described below, followed by illustrative embodiments of the invention.

The boundary conditions for the magnetic flux density (B) and magnetic field (H) follow the following relationships:

$$B_2 \cdot n = B_1 \cdot n,\ B_2 \times n = (\mu_2/\mu_1)\ B_1 \times n$$

or $$H_2 \cdot n = (\mu_2/\mu_1) H_1 \cdot n,\ H_2 \times n = H_1 \times n$$

Figure 3:
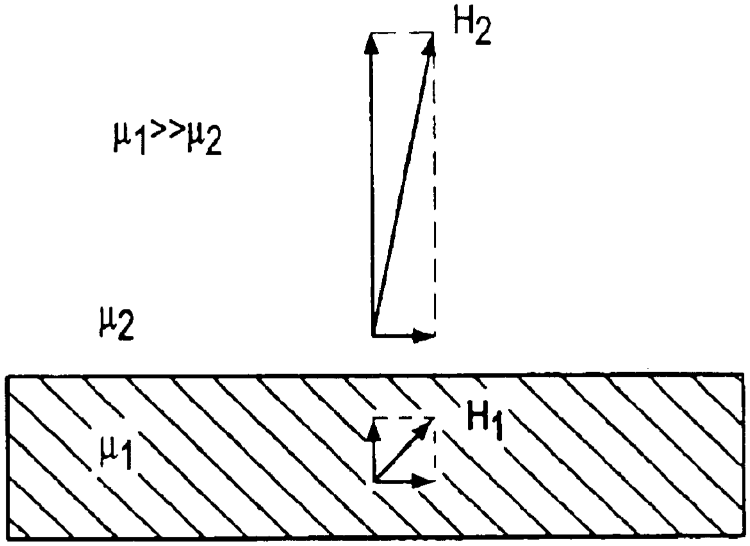
FIG. 3 illustrates the boundary conditions on the magnetic field (H) at a boundary between two materials with different permeability (m1>>m2).

If $\mu_1 >> \mu_2$, the normal component of $H_2$ is much larger than the normal component of $H_1$, as shown in FIG. 3. In the limit $(\mu_1/\mu_2) \rightarrow \infty$, the magnetic field $H_2$ is normal to the boundary surface, independent of the direction of $H_1$ (barring the exceptional case of $H_1$ exactly parallel to the interface). If the second media is air ($\mu_2=1$), then $B_2=\mu_0 H_2$, so that the flux lines $B_2$ will also be perpendicular to the surface. This property is used to produce magnetic fields that are perpendicular to the horizontal plane of the cantilever in a micromagnetic latching switch and to relax the permanent magnet alignment requirements.

FIGS. 4A and 4B shows the computer simulation of magnetic flux (B) distributions. As can be seen, without the high-permeability magnetic layer (a), the flux lines are less perpendicular to the horizontal plane, resulting in a large horizontal (x) component. The magnetic flux lines are approximately perpendicular to the horizontal plane in a relatively large region when a high-permeability magnetic layer is introduced with its surface parallel to horizontal plane (b). The region indicated by the box with dashed lines will be the preferred location of the switch with the cantilever horizontal plane parallel to the horizontal axis (x).

FIGS. 5A–C show the extracted horizontal components (Bx) of the magnetic flux along cut-lines at various heights (y=−75 mm, −25 mm, 25 mm . . . ). From the top to bottom (a1–b1–c1), the right hand figures correspond to case (a) single permanent magnet, (b) a permanent magnet with a high-permeability magnetic layer (thickness t=100 mm), and another case where the high-permeability magnetic layer thickness is t=25 mm. In (a1) without the high-permeability magnetic layer, we can see that Bx increases rapidly away from the center. In (b1), Bx is reduced from (a1) due to the use of the high-permeability magnetic layer. A thinner high-m layer (c1) is less effective as the thicker one (b1).

This property, that the magnetic field is normal to the boundary surface of a high-permeability material, and the placement of the cantilever (soft magnetic) with its horizontal plane parallel to the surface of the high-permeability material, can be used in many different configurations to relax the permanent magnet alignment requirement.

FIGS. 6A and 6B show a top view and a side view, respectively, of a micromagnetic latching switch 600 with relaxed permanent magnet alignment according to an aspect the present invention. In this embodiment, two high-permeability magnetic layers are used to help the magnetic alignment in making the micromagnetic latching switch. The switch comprises the following basic elements: first high-permeability magnetic layer 602, substrate 604, second high-permeability magnetic layer 606, dielectric layers 608 and 610, a spiral coil 612, bottom conductor 614, cantilever assembly 616 (with a least a soft magnetic layer 618 and other conducting and/or supporting torsion spring 620), and a top permanent magnetic layer 622 with a vertical magnetization orientation. Preferably, the surfaces of the permanent magnet 622 and the high-permeability magnetic layers 602 and 606 are all parallel to the horizontal plane 630 of the cantilever 616 so that the horizontal component of the magnetic field produced by 622 is greatly reduced near cantilever 616. Alternatively, a single soft magnetic layer (602 or 606) can be used.

FIG. 7 shows another embodiment of the micromagnetic latching switch. In this embodiment, two high-permeability magnetic layers are used to help the magnetic alignment in making the micromagnetic latching switch. The switch comprises the similar basic elements as shown in FIG. 6. What differs this embodiment from that of FIG. 6 is that the second high-permeability magnetic layer 702 is placed just below the top permanent magnet 622. Again, preferably, the surfaces of the permanent magnet 622 and the high-permeability magnetic layers 602 and 702 are all parallel to the horizontal plane 630 of the cantilever 616 so that the horizontal component of the magnetic field produced by 622 is greatly reduced near cantilever 616.

FIG. 8 shows another embodiment of the micromagnetic latching switch. In this embodiment, several high-permeability magnetic layers 602, 802, 804 and 806 are placed around the permanent magnet 622 and the cantilever switch in a package to form a magnetic loop. The bottom high-permeability magnetic layer 602 helps to reduce the horizontal field component near cantilever 616, and the layers 802, 804 and 806 screens the external field and improve the internal magnetic field strength.

The above cases are provided as examples to illustrate the use of high-permeability magnetic materials in combination with permanent magnets to produce magnetic fields perpendicular to the horizontal plane of the cantilever of the micromagnetic latching switches. Different variations (multiple layers, different placements, etc.) can be designed based on this principle to accomplish the goal of relaxing the alignment of the permanent magnet with the cantilever to make the switch bi-stable (latching) and easy (low current) to switch from one state to the other.

In another embodiment pf the present invention, the switch system comprises micromagnetic cantilevers, electromagnets (S-shape or single-line coils), permanent magnetic and soft magnetic layer in parallel to provide an approximate uniform magnetic field distribution, single-pole double-throw (SPDT) schemes, and transmission line structures suitable for radio frequency signal transmissions.

FIGS. 9A and 9B shows a top view and a side view, respectively, of a micromagnetic latching switch with additional features of the present invention. The switch 900 comprises the following basic elements: a cantilever made of soft magnetic material (e.g. permalloy) and a conducting layer, cantilever-supporting hinges (torsion spring), bottom contacts that serve as the signal lines, an "S-shape" planar conducting coil, a permalloy layer (or other soft magnetic material) on the substrate (which is normalloy silicon, GaAs, glass, etc), and a bottom permanent magnet (e.g., Neodymium) attached to the bottom of the substrate. The magnet can be placed or fabricated directly on the substrate. The magnetization orientation of the magnet is either along +Z or along −Z. Due to the soft magnetic material's nature of high permeability, the magnetic field near the permalloy top surface is self-aligned parallel to z-axis (or approximately perpendicular to the permalloy layer surface). This self-aligned field is needed for holding the cantilever in either on or off state. The whole device is housed in a suitable package (not shown) with proper sealing and electrical contact leads.

For the best performance, the cantilever centerline (which may not be the same as the hinge line) should be located approximately near the center of the magnet, i.e., the two distances from the edge (w1 and w2) are approximately equal. However, the cantilever centerline can also be located away from the center of the magnets and the device will still be functional. The S-shape coil produces the switching magnetic field to switch the cantilever from one state to the other by applying positive or negative current pulses into the coil. In the figure, the effective coil turn number under the cantilever is 5. However, the coil turn number n can be any arbitrary positive integer number ($1 \leqq n \leqq \infty$). When the turn number is one, it means there is just a single switching metal line under the cantilever. This is very useful design when the device size is scaled down. In addition, multilayer coil can also be used to strength the switching capability. This can be done by adding the successive coil layers on top of the other layer(s). Coil layers can be spaced by the in-between insulator and connected through the conducting vias.

The permanent magnetic field holds (latches) the cantilever to either state. When the cantilever toggles to the right, the cantilever's bottom conductor (e.g., Au) touches the bottom contacts and connects the signal line 1. In this case, the signal line 2 is disconnected. On the other hand, when the cantilever toggles to the left, the signal line 2 is connected and signal line 1 is disconnected. It forms a SPDT latching switch. Although in the figure, the widths of the magnet and permalloy layer on substrate are same, in reality, they can be different. The width of the magnet can either be larger or smaller than the width of permalloy layer.

Embodiments for Packaging Latching MEMS Switches According to the Present Invention Structural and operational implementations for packaging latching micromagnetic switches according to the present invention are described in detail as follows. Additional packaging embodiments will become apparent to persons skilled in the relevant art(s) from the teachings herein. Package types applicable to the present invention include leaded and leadless packages, and surface mounted and non-surface mounted package types. For example, the present invention is applicable to packaging in dual-in-line packages (DIPs), leadless chip carrier (LCC) packages (including plastic and ceramic types), plastic quad flat pack (PQFP) packages, thin quad flat pack (TQFP) packages, small outline IC (SOIC) packages, pin grid array (PGA) packages (including plastic and ceramic types), and ball grid array (BGA) packages (including ceramic, tape, metal, and plastic types).

Various packaging embodiments are provided below for purposes of illustration, and are not intended to be limiting. The present invention can be packaged in a variety of ways, as would be understood by persons skilled in the relevant art(s) from the teachings herein.

As described above, various conventional packaging techniques are applicable to the present invention, such as wire or ribbon bonding, flipchip or even wafer-scale packaging. FIG. 10 illustrates a package 1000 that incorporates wire bonding, according to an embodiment of the present invention. Package 1000 includes a MEMS latch (i.e., a latching micromagnetic switch) 1002, a substrate 1004, an opposed permanent magnet 1006, a cap 1008, and a wire bond 1010.

As shown in FIG. 10, MEMS latch 1002 is attached to a first surface 1014 of a substrate 1004. MEMS latch 1002 can be an integrated circuit (IC) chip or other structure in which a latching micromachined switch can be formed. MEMS latch 1002 can include a single latching micromachined switch, a plurality of latching micromachined switches, or a combination of one or more latching micromachined switches and other mechanical and/or electronic circuit elements. MEMS latch 1002 can be mounted/attached to first surface 1014 by a variety of mechanisms, including an epoxy or solder.

Substrate 1004 can be one of a number substrate types, including ceramic, plastic, and tape. Substrate 1004 has a first surface 1014 and a second surface 1018. Substrate 1004 generally includes one or more conductive layers bonded with one or more dielectric materials. For instance, the dielectric material can be made from various substances, such as polyimide tape. The conductive layers are typically made from a metal, such as copper, aluminum, nickel, tin, etc., or combination/alloy thereof. Trace or routing patterns are made in the conductive layer material. A plurality of vias can be formed in substrate 1004 that are conductively filled to allow coupling of traces between conductive layers. For example, as shown in FIG. 10, a conductively-filled via 1012 in substrate 1004 couples a trace (not shown) on first surface 1014 to a solder ball pad 1020 on second surface 1018 of substrate 1004.

MEMS latch 1002 can also be formed integrally with substrate 1004. For example, substrate 1004 can be formed from gallium arsenide, silicon, glass, quartz, or other material in which MEMS latch 1002 can be directly etched or otherwise formed.

As shown in FIG. 10, a solder ball 1022 can be attached to solder ball pad 1020, for surface mount of package 1000 to a printed circuit board (PCB). In embodiments, second surface 1018 can be covered with an array of solder ball pads 1020 to for surface mount to the PCB. Note that package 1000 is adaptable to other ways of attaching package 1000 to a PCB. For example, instead of having solder ball pads 1020, package 1000 can have metal pads or leads located on the sides of package 1000 for plugging into, or surface mount to the PCB.

Cap 1008 is attached to first surface 1002. An inner surface 1016 of cap 1008 encloses MEMS latch 1002 on first surface 1014. Cap 1002 aids in protecting MEMS latch 1002 from moisture, dust, and other contaminants in the ambient environment. Cap 1008 can be attached to first surface 1014 in a number of ways, including by an epoxy, by lamination, solder, and additional ways. Cap 1008 can be made from a metal, or an alloy/combination of metals, such as copper, tin, and aluminum. Cap 1008 can also be formed from silicon, gallium arsenide, glass, or ceramic, and either separately attached to substrate 1004 or integrally formed with substrate 1004 and MEMS latch 1002. Alternatively, cap 1008 can be made from a plastic or polymer. Cap 1008 can also act as a heat sink, and allow for greater conduction of heat from MEMS latch 1002 to the ambient environment. Cap 1008 can be a single-piece structure, or can be two or more pieces that are assembled/coupled together.

Permanent magnet 1006 is attached to inner surface 1016 of cap 1008. Permanent magnet 1006 is a magnet substantially similar to magnet 102, the operation and structure thereof is described more fully above. Permanent magnet 1006 is positioned closely adjacent to MEMS latch 1002, to create the magnetic field 134 used for operation of MEMS latch 1002, as described above. As precise positioning of permanent magnet 1006 is important, infrared alignment or other known techniques can be used. Permanent magnet 1006 can be attached to inner surface 1016 in a number of ways, including by an epoxy, lamination, solder, and additional ways.

Note that in an alternative embodiment, permanent magnet 1006 can be mounted on first surface 1014, and MEMS latch 1002 can be mounted on permanent magnet 1006, instead of on first surface 1014.

In the embodiment shown in FIG. 10, a wire bond 1010 couples a contact pad 1024 on MEMS latch 1002 to a trace on first surface 1014. In this manner, signals of MEMS latch 1002 can be coupled to corresponding signals of the PCB, through wire bond 1010, one or more traces and vias of substrate 1004, and solder ball 1022.

FIG. 11 shows an example package 1100, according to another embodiment of the present invention. Package 1100 is similar to package 1000, except that MEMS latch 1002 is configured in a flip chip orientation. Typically, in the embodiment of FIG. 11, MEMS latch 1002 is flipped and solder bumped, for mounting to corresponding solder pads on first surface 1014 of substrate 1004. An example solder bump 1102 is shown in FIG. 11. Solder bump 1102 attaches a contact pad of MEMS latch 1002 to first surface 1014. Hence, wire bonds are not required in package 1100.

In an flip chip embodiment, permanent magnet 1006 can be attached to inner surface 1016 to a surface of MEMS latch 1002, or to both inner surface 1016 and MEMS latch 1002. For example, as shown in FIG. 11, permanent magnet 1006 is attached directly to MEMS latch 1002.

Note that in an embodiment, solder bumps 1102 are sufficiently high enough so that the bottom surface of MEMS latch 1002 may have operational latching micromagnetic switches thereupon, without first surface 1014 of substrate 1004 interfering with their operation. In an alternative embodiment, latching micromagnetic switches of MEMS latch 1002 are formed on the top surface of MEMS latch 1002. In this embodiment, a cavity is formed in one or both of the top surface of MEMS latch 1002 and the bottom surface of permanent magnet 1006 to provide the latching micromagnetic switches sufficient clearance to operate properly.

FIG. 12 shows an example package 1200, according to another embodiment of the present invention. Package 1200 is similar to packages 1000 and 1100, and implements a wafer-scale packaging approach. MEMS latch 1002 is shown attached to inner surface 1016. Wire bond 1010 couples a contact pad 1024 on MEMS latch 1002 to a trace on first surface 1014. Permanent magnet 1006 (not shown) can be attached to first surface 1014, for example.

In a wafer-scale packaging approach, a plurality of caps 1008 are formed in a wafer. The wafer of caps 1008 can be inverted and attached to a second wafer having a corresponding plurality of MEMS latches 1002 formed thereupon. Individual packages can then be separated from the attached wafers, to form a plurality of separate packages. The embodiments shown in FIGS. 10 and 12 are also applicable to a wafer-scale approach.

Note that a hermetic sealing material 1202 that uses an inorganic passivation with a solder or gold tin seal, for example, is shown in FIG. 12, as would be understood to persons skilled in the relevant art(s) based on the teachings herein. Hermetic sealing 1202 can also be used in package 1000 and package 1100.

Furthermore, note that solder balls may be attached to solder ball pads 1020 on second surface 1018 of package 1200 to allow package 1200 to be mounted on a PCB. Alternatively, packages 1200, and packages 1000 and 1100, may be directly soldered to a PCB, without solder balls being pre-attached, and may be attached to a PCB by other means.

Note that it is important that external magnetic and/or electrical fields do not interfere with the latching function of MEMS latch 1002. Metal plates or housings of various shapes and configurations can be employed to prevent external fields from affecting operation of MEMS latch 1002. Various metals, metal alloys and energy absorbing materials or layers can be used. The shape, thickness, and other dimensions of such plates, housings or layers would depend on the particular application, and would also be apparent to person(s) skilled in the relevant art(s) based on the teachings herein. In embodiments, cap 1008 can incorporate some or all of the necessary shielding to protect MEMS latch 1002 from external magnetic and/or electrical fields.

Packaging Embodiments with Various Coil Arrangements

Structural and operational implementations for packaging latching micromagnetic switches having various coil arrangements are described in detail as follows. These embodiments are provided below for purposes of illustration, and are not intended to be limiting. The present invention can be arranged and packaged in a variety of ways, as would be understood by persons skilled in the relevant art(s) from the teachings herein.

FIG. 13 shows an example package 1300, according to an embodiment of the present invention. Package 1300 includes insulating layer 106, first contact 108*a*, second contact 108*b*, cantilever 112, conductor 114, substrate 1004, permanent magnet 1006, and cap 1008. As shown in FIG. 13, a MEMS latch is formed directly on substrate 1004. FIG. 13 shows a MEMS latch configuration where cantilever 112 can be caused to couple with one of first and second contacts 108*a* and 108*b*, similar to the embodiment shown in FIGS. 9A and 9B. Note that package 1300 is also applicable to a single-contact switch, such as shown in FIGS. 1A and 1B, and other numbers of contact switches.

As described above, cap 1008 can be formed directly on, or formed separately and subsequently attached to the remainder of package 1300. For example, a separately formed cap 1008 can be attached to insulating layer 106 in a similar manner as cap 1008 is attached to substrate 1004, as described above. For example, cap 1008 can be attached to insulator 120 by wafer scale bonding. Cap 1008 can be formed from a number of processes described elsewhere herein, including micromachining and deep reactive ion etching.

FIG. 14 shows an example package 1400, according to another embodiment of the present invention. Package 1400 is similar to package 1300 shown in FIG. 13, except that conductor 114 and insulating layer 106 are located on an outer surface 1402 of cap 1008. Conductor 114 operates as an electromagnet, as described above. A power source (not shown in FIG. 14) is coupled to conductor 114 so that conductor 114 can conduct electricity. When conductor 114 conducts electricity, a magnetic field is generated around conductor 114, causing actuation of the MEMS latch, as described above. Conductor 114 is typically a planar coil, as described above. However, conductor 114 may be other coil types, including a three-dimensional coil.

Conductor 114 and insulating layer 106 can be formed directly on cap outer surface 1402 of cap 1008, or can be formed separately, and subsequently attached to cap 1008. Conductor 114 can be formed on cap 1008 by screen printing, for example. Conductor 114 and insulating layer 106 can also be formed, and then attached to cap 1008 by an epoxy, lamination, or other means.

As shown in FIG. 14, an optional magnetic layer 1404 can be present, to enhance operation of the MEMS latch. In an embodiment, magnetic layer 1404 is a high-permeability magnetic layer. The surface of magnetic layer 1404 is configured to be substantially parallel to the horizontal plane of cantilever 112 so that the horizontal component of the magnetic field produced by permanent magnet 1006 is greatly reduced near cantilever 112. Magnetic layer 1404 can be formed directly on insulating layer 106, or can be formed and then attached to insulating layer 106 by an epoxy, lamination, or other means.

FIG. 15 shows an example package 1500, according to another embodiment of the present invention. Package 1500 is similar to package 1400 shown in FIG. 14, except that conductor 114 and insulating layer 106 are located on inner surface 1016 of cap 1008. A power source (not shown in FIG. 15) is coupled to conductor 114 so that conductor 114 can conduct electricity. When conductor 114 conducts electricity, a magnetic field is generated around conductor 114, causing actuation of the MEMS latch, as described above.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A package for a micromagnetic latching switch, comprising:

a substrate defined by opposing first and second surfaces, wherein said substrate includes a conductively filled via, wherein said via couples a trace on said first surface of said substrate to a contact pad on said second surface of said substrate;

a micromagnetic switch integrated circuit (IC) chip that is mounted to said first surface, wherein a contact pad on said chip is coupled to said trace, wherein said chip includes at least one moveable micro-machined cantilever having a magnetic material and a longitudinal axis;

a permanent magnet positioned closely adjacent to said chip, wherein said permanent magnet produces a first magnetic field which induces a magnetization in said magnetic material, said magnetization characterized by a magnetization vector pointing in a direction along said longitudinal axis of said cantilever, wherein said first magnetic field is anproximately perpendicular to said longitudinal axis;

an electromagnet producing a second magnetic field to switch said cantilever between a first stable state and a second stable state, wherein a temporary current through said electromagnet produces said second magnetic field such that a component of said second magnetic field parallel to said longitudinal axis changes direction of said magnetization vector thereby causing said cantilever to switch between said first stable state and said second stable state; and a cap attached to said first surface, wherein an inner surface of said cap forms an enclosure to enclose said chip on said first surface.

2. The package of claim 1, wherein said permanent magnet is attached to said inner surface of said cap.

3. The package of claim 1, further comprising:

a bond wire that couples said contact pad on said chip to said trace.

4. The package of claim 1, wherein said chip is flip chip mounted to said first surface.

5. The package of claim 4, wherein said permanent magnet is attached to said chip.

6. The package of claim 1, further comprising a solder ball attached to said solder ball pad.

7. A package for a micromagnetic latching switch, comprising:

a substrate defined by opposing first and second surfaces, wherein said substrate includes a conductively filled via, wherein said via couples a trace on said first surface of said substrate to a contact pad on said second surface of said substrate;

a cap attached to said first surface, wherein an inner surface of said cap forms an enclosure that encloses a portion of said first surface;

a micromagnetic switch integrated circuit (IC) chip that is mounted to said inner surface, wherein said chip includes at least one moveable micro-machined cantilever having a magnetic material and a longitudinal axis;

a permanent magnet positioned closely adjacent to said chip, wherein said permanent magnet produces a first magnetic field which induces a magnetization in said magnetic material, said magnetization characterized by a magnetization vector pointing in a direction along said longitudinal axis of said cantilever, wherein said first magnetic field is approximately perpendicular to said longitudinal axis;

an electromagnet producing a second magnetic field to switch said cantilever between a first stable state and a second stable state, wherein a temporary current through said electromagnet produces said second magnetic field such that a component of said second magnetic field parallel to said longitudinal axis changes direction of said magnetization vector thereby causing said cantilever to switch between said first stable state and said second stable state; and a wire bond that couples a contact pad on said chip to said trace.

8. The package of claim 7, wherein said permanent magnet is mounted on said first surface.

9. A package for a micromagnetic latching switch, comprising:

a substrate that has a surface;

a moveable micro-machined cantilever supported by said surface of said substrate, wherein said cantilever has a magnetic material and a longitudinal axis;

a cap attached to said surface of said substrate, wherein an inner surface of said cap forms an enclosure that encloses said cantilever on said surface of said substrate;

a permanent magnet positioned closely adjacent to said cantilever, wherein said permanent magnet produces a first magnetic field which induces a magnetization in said magnetic material, said magnetization characterized by a magnetization vector pointing in a direction along said longitudinal axis of said cantilever, wherein said first magnetic field is approximately perpendicular to said longitudinal axis; and an electromagnet attached to said cap, wherein said electromagnet produces a second magnetic field to switch said cantilever between a first stable state and a second stable state, wherein a temporary current through said electromagnet produces said second magnetic field such that a component of said second magnetic field parallel to said longitudinal axis changes direction of said magnetization vector thereby causing said cantilever to switch between said first stable state and said second stable state.

10. The package of claim 9, wherein said electromagnet includes:

a conductor; and an insulator layer that insulates said conductor.

11. The package of claim 9, wherein said permanent magnet is attached to a second surface of said substrate.

12. The package of claim 9, wherein said electromagnet is attached to said inner surface.

13. The package of claim 9, wherein said electromagnet is coupled to said inner surface, further comprising:

a magnetic layer formed between said inner surface and said electromagnet.

14. The package of claim 9, wherein said electromagnet is attached to an outer surface of said cap.

15. The package of claim 14, further comprising:

a magnetic layer formed on said electromagnet.

16. The package of claim 1, wherein said chip includes said electromagnet.

17. The package of claim 1, wherein said contact pad on said second surface of said substrate is a solder ball pad.

18. The package of claim 7, wherein said chip includes said electromagnet.

19. The package of claim 7, wherein said contact pad on said second surface of said substrate is a solder ball pad.

* * * * *

UNITED STATES PATENT AND TRADEMARK OFFICE

CERTIFICATE OF CORRECTION

PATENT NO. : 6,894,592 B2 
APPLICATION NO. : 10/147915
DATED : May 17, 2005
INVENTOR(S) : Shen et al.

It is certified that error appears in the above-identified patent and that said Letters Patent is hereby corrected as shown below:

Column 15

In claim 6, line 30, "The package of claim 1, further comprising" should be replaced with --The package of claim 17, further comprising--.

Signed and Sealed this

Seventh Day of November, 2006

JON W. DUDAS

*Director of the United States Patent and Trademark Office*